March 31, 1959 V. EY 2,879,790
AUTOMATIC FLUID SHUT OFF VALVE
Filed April 24, 1957 2 Sheets-Sheet 1
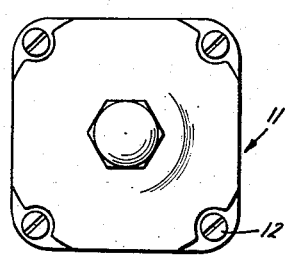
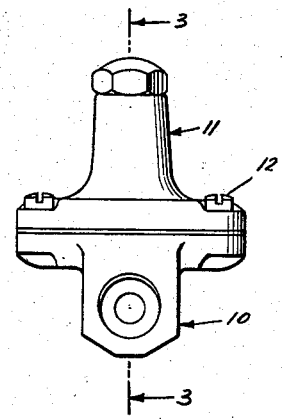
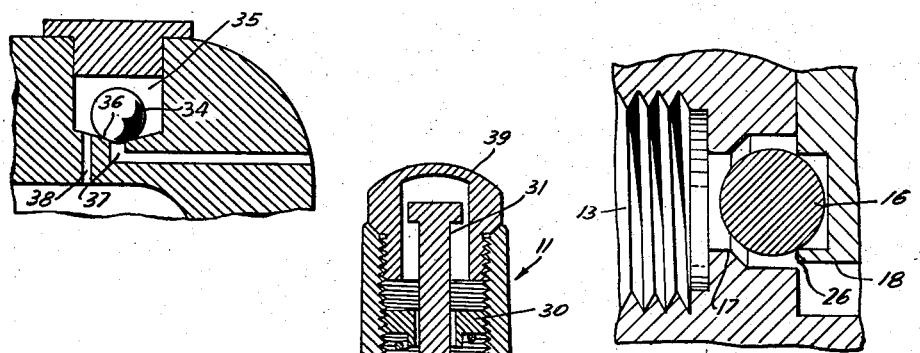
INVENTOR.
VICTOR EY
BY
ATTORNEYS March 31, 1959 V. EY 2,879,790
AUTOMATIC FLUID SHUT OFF VALVE
Filed April 24, 1957 2 Sheets-Sheet 2

INVENTOR.
VICTOR EY
BY
ATTORNEYS

2,879,790

AUTOMATIC FLUID SHUT OFF VALVE

Victor Ey, Woodside, N.Y.

Application April 24, 1957, Serial No. 654,721

7 Claims. (Cl. 137—458)

This invention relates to a shut off valve for fluid pressure supply lines.

An object of the invention is to provide a shut off valve for shutting off the flow of either gaseous or liquid fluids.

Another object of the invention resides in the movement of a control member in two directions to shut off the valve with the movement of the control member in either direction.

Another object of the invention is to provide a shut off valve for use in service pipe lines supplying gas to homes, commercial buildings and the like which will close off the supply thereto in the event of a leak or rupture developing in the service line or in the event the service line or shut off valve is damaged by fire.

Still another object of the invention is to provide a shut off valve of the diaphragm type which will automatically close off the flow through the valve in the event the diaphragm is damaged so as to increase the pressure above the diaphragm and which will also shut off the flow through the valve in the event that the flow through the service line increased beyond a predetermined setting of the valve.

Still another object of the invention is to provide a shut off valve of said character which necessitates the dismantling of the valve in the event that the valve is shut off due to damage to the diaphragm thereof.

The invention also comprehends in another of its forms a fluid pressure regulator which is constructed to shut off the flow therethrough in the event that the flow through the outlet end thereof exceeds the maximum setting on the regulator.

With the foregoing and other objects in view, reference is now made to the following specification and accompanying drawings in which the preferred forms of the invention are illustrated.

In the drawings:

Fig. 1 is a view in elevation of a shut off valve constructed in accordance with the invention.

Fig. 2 is a top plan view thereof.

Fig. 3 is an enlarged vertical sectional view taken approximately on line 3—3 of Fig. 1.

Fig. 4 is an enlarged fragmentary section of the vent in the cover section.

Fig. 5 is a fragmentary sectional view showing the ball valve positioned in open relation.

Figure 6:
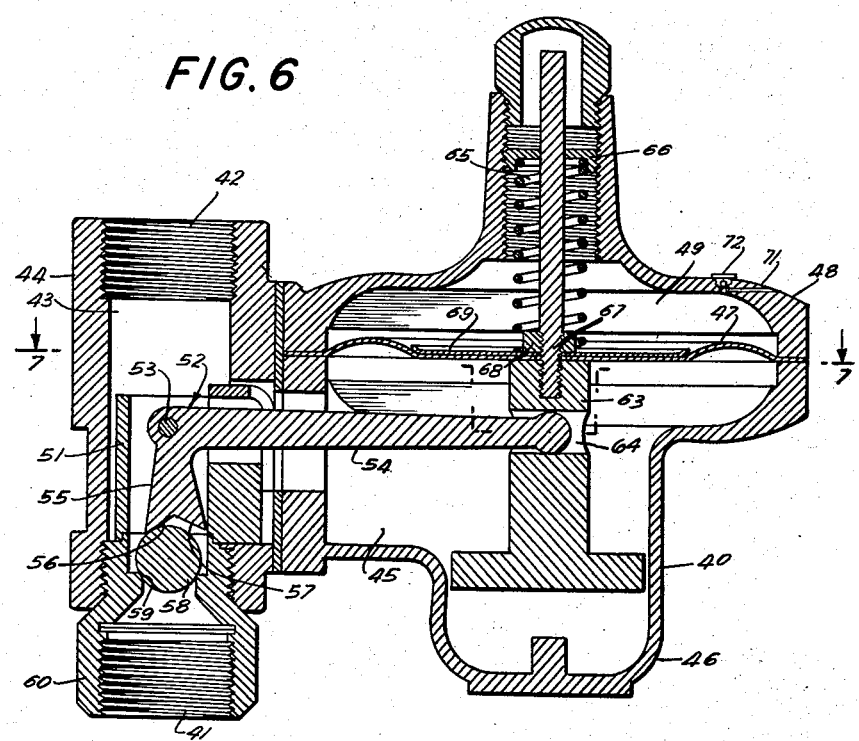
Fig. 6 is a vertical sectional view of a fluid pressure regulator provided with shut off means constructed in accordance with the invention.

Referring to the drawings the shut off valve shown in Figs. 1 to 5 inclusive of the drawings is adapted for use in service lines to apparatus in buildings and homes for automatically shutting off the fluid to the apparatus under certain conditions.

The shut off valve includes a body section 10 and a hollow cover section 11 which are secured together by screws 12 or other fastening means. The body section 10 is provided with a threaded inlet 13 and a threaded outlet 14 which are arranged in axial alignment and in communication through a flow passage 15. The flow of fluid through the inlet 13 is controlled by a ball valve 16 which is located in the passage 15 and is adapted to engage a valve seat 17 for closing off the flow through the valve. The ball valve is controlled by a stem 18 which is secured to a diaphragm 19 so as to move therewith in relation to differential of pressure on opposite sides of the diaphragm. The stem 18 is slidable in a central opening 20 in the partition wall 21 of the valve body 10 and protrudes into the flow passage 15.

The diaphragm 19 is secured about its periphery between the body section 10 and the cover section 11 so as to form oppositely disposed chambers 22 and 23 on opposite sides of the diaphragm and which chambers are located in the cover section 11 and body section 10 respectively. The stem 18 is annularly recessed at its free end to provide spaced annular shoulders 25 and 26 which are adapted to engage the ball valve and cam the same into closed relation with its seat upon movement of the diaphragm in either direction in relation to the differential of pressure on opposite sides thereof. Thus the shoulder 25 will engage and move the ball valve into closed relation upon a decrease of pressure in the outlet 14 beyond a predetermined setting of a bias pressure on the valve by a spring 27 and the shoulder 26 will engage and move the ball valve into closed relation with its seat upon increase of pressure in the outlet 14 beyond a predetermined setting of the bias pressure on the diaphragm. The outlet 14 is in communication with the chamber 23 through a duct 28 in the partition wall 21 of the body section 10. The coil spring 27 is interposed between the diaphragm and a threaded disk 30 which is adjustable in the threaded upper end of the cover section 11 to vary the pressure on the diaphragm.

The stem 18 is secured to the diaphragm 19 by a stud 31 which stem is slidably mounted in the disk 30 with the inner end thereof extending through the diaphragm and anchored in the stem 18. A lock nut 32 threadedly engages the stud and tightens an annular plate 33 against the upper face of the diaphragm and secures the diaphragm between the plate and the stem.

The cover section 11 is provided with a vent having a ball valve closure 34 arranged to permit of the gradual flow of air out of the chamber 22 in response to pressure differential between the chambers 22 and 23 and to permit of the rapid flow of air into the chamber 22 so that the ball valve 16 opens quickly when the service line connected with the outlet opening 14 requires increased flow of gas.

As illustrated, the ball valve 34 is arranged in a chamber 35 normally to seat on a cracked or partially open valve seat 36 arranged at the inner end of a vent 37 opening through the wall of the cover section. An inlet duct 38 provides communication between the chambers 22 and 35. Thus, the ball valve 34 will be raised from its seat to permit of the flow of air into the chamber 22 when the pressure in the chamber 23 and in the outlet 14 decreases to thereby permit of the rapid opening of the ball valve 16. The cracked seat 36 also provides means by which air from the chamber 22 will gradually flow through the vent 37 when there is an increase of pressure in the chamber 23 and outlet 14 to thereby meter the closing movement of the ball valve 16.

The shut off valve provides a safety factor which insures that the service line connected with the inlet 14 is shut off in the event that the flow to the inlet 13 is shut off, as when the supply line from the gas main in the street is closed. When such condition exists, it will be necessary to manually adjust the shut off valve in order to place the same in operation. This is effected by removing the cap 39 and raising the stud 31 to thereby free the ball valve 16 from the flow of gas through the valve.

The shut off valve also has utility for shutting off the supply line in the event that a high back pressure takes place in the outlet 14 sufficient to rupture the diaphragm 19 whereupon the ball valve 16 is maintained in closed relation.

The shut off valve may be embodied in a fluid pressure regulator in which the valve is closed with the movement of the diaphragm of the pressure regulator to the extremes of two positions thereof.

Figure 7:
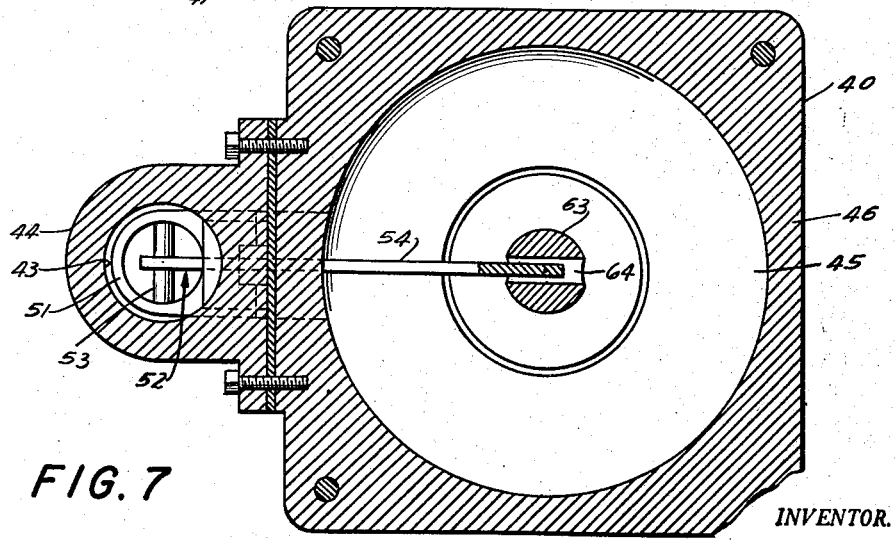
Fig. 7 is a transverse sectional view taken approximately on line 7—7 of Fig. 6.

The fluid pressure regulator shown in Figs. 6 and 7 of the drawings includes a casing 40 having threaded inlet and outlet openings 41 and 42 arranged in axial alignment for connection with a high pressure supply line and a lower pressure service line. Intermediate the inlet and outlet openings the casing is formed with a flow passage 43 in a casing section 44 which passage communicates through an opening in the wall of the casing section 44 with a chamber 45 in a casing section 46 on one side of a diaphragm 47. The diaphragm 47 is secured at its periphery between the casing 46 and a cover section 48 which provides a chamber 49 above the diaphragm 47. Secured to the casing section 44 is an open ended cylindrical member 51 arranged in axial alignment with the inlet and outlet openings 41 and 42.

A valve lever 52 is pivoted to the cylindrical member 51 on pin 53 and includes an elongated arm 54 extending into the chamber 45 to a position centrally below the diaphragm 47 with which it is connected for rocking movement with the movement of the diaphragm. The valve lever 52 also includes an angulated end 55 having a recess in its free end providing angulated faces 56 and 57 which are adapted to respectively engage a ball valve 58 for camming the same to closed relation on a valve seat 59 when either of said faces 56 and 57 engage the ball valve in accordance with the movement of the diaphragm 47 to its extreme positions. The valve seat 59 is formed on the inner end of a bushing 60 threadedly secured in one end of the casing section 44 and which bushing forms the inlet opening 41.

The lever 52 has rocking movement on the cross pin 53 by the pressure differential on opposite sides of the diaphragm 47. The diaphragm is secured to a member 63 having a socket opening 64 in which the inner end of the lever 52 is received. Downward pressure is maintained on the diaphragm by means of a spring 65 interposed between the diaphragm and a disk 66 threadedly engaged in the reduced portion of the cover section 48. A stem 67 is slidable in the disk 66 with the lower end thereof threadedly secured to the member 63 and with a nut 68 tightened against an annular plate 69 for securing the member 63 and the plate 69 to the diaphragm.

The cover section 48 is provided with a vent 71 having a ball valve closure 72 arranged to permit of the gradual flow of air out of the chamber 49 in response to pressure differential between the chambers 45 and 49 and to permit of the rapid flow of air into the chamber 49 so that the ball valve 58 opens quickly when the service line connected with the outlet opening 42 requires increased flow of gas similar to the construction of the vent in the previous form of the invention.

It will be understood that in each form of the invention the ball valve is gradually moved to open relation to provide a metering or regulating action thereof. As shown in Fig. 5 of the drawings, the ball valve 16 is retained in closed relation by the shoulder 26 when the stem 18 is in the upper position. When the stem 18 moves downward due to a decrease of pressure in the chamber 23, the shoulder 26 will free the ball valve 36 for gradual movement away from the valve seat 17 until the ball valve abuts against the shoulders 25 and 26 as shown in Fig. 5 of the drawings.

While the invention has been shown in its application to the preferred forms thereof, it is to be understood that the same is not so limited but shall cover and include any and all modifications of the invention which fall within the purview thereof.

What is claimed is:

1. In a fluid shut off valve, a valve body provided with inlet and outlet ports and a flow passage in communication with said ports, a ball valve for closing off the flow of the fluid to the flow passage from the inlet port, said valve body having a cavity and a diaphragm arranged in said cavity subdividing the cavity into oppositely disposed chambers, said valve body having an opening permitting of the flow of outside air to and from one of said chambers and an opening establishing communication between the other chamber and said outlet port, said diaphragm being movable to opposite positions in response to differential of pressure on opposite sides thereof, and means connected with said diaphragm and having spaced portions adapted to abut against the periphery of the ball valve at spaced locations respectively, one of the portions of said means abutting against the ball valve and moving the ball valve to closed relation with the movement of the diaphragm to one position and the other portion of said means abutting against the ball valve and moving the same to closed relation with the movement of said diaphragm to the other position.

2. In a fluid shut off valve, a valve body provided with inlet and outlet ports and a flow passage in communication with said ports, a ball valve for closing off the flow of the fluid to the flow passage from the inlet port, said valve body having a cavity and a diaphragm arranged in said cavity subdividing the cavity into oppositely disposed chambers, said valve body having an opening permitting of the flow of outside air to and from one of said chambers and an opening establishing communication between the other chamber and said outlet port, said diaphragm being movable to opposite positions in response to differential of pressure on opposite sides thereof, and a member connected with said diaphragm and having spaced portions adapted to abut against the periphery of the ball valve at spaced locations respectively, one of the portions of said member abutting against the ball valve and moving the ball valve to closed relation with the movement of the diaphragm to one position and the other portion of said member abutting against the ball valve and moving the same to closed relation with the movement of said diaphragm to the other position, and said member being recessed between said spaced portions to permit of the movement of the ball valve to open relation.

3. In a fluid shut off valve, a valve body provided with inlet and outlet ports and a flow passage in communication with said ports, a ball valve for closing off the flow of the fluid to the flow passage from the inlet port, said valve body having a cavity and a diaphragm arranged in said cavity subdividing the cavity into oppositely disposed chambers, said valve body having an opening permitting of the flow of outside air to and from one of said chambers and an opening establishing communication between the other chamber and said outlet port, a stem affixed to said diaphragm and extending into said flow passage, said stem having spaced portions with a recess therebetween, said portions engaging said ball valve for moving the same to close off the flow from the inlet port by differential of pressure on opposite sides of the diaphragm, one of said portions moving said ball valve to closed relation with the movement of the diaphragm to a limit position in one direction and the other of said portions moving said ball valve to closed relation with the movement of the diaphragm to a limit position in the opposite direction.

4. In a fluid shut off valve, a valve body provided with inlet and outlet ports and a flow passage in communication with said ports, a ball valve for closing off the flow of the fluid to the flow passage from the inlet port, said valve body having a cavity and a diaphragm arranged in said cavity subdividing the cavity into oppositely disposed chambers, said valve body having an opening permitting of the flow of outside air to and from one of said chambers and an opening establishing communication between the other chamber and said outlet port, a stem affixed to said diaphragm and extending into said flow passage, said stem having spaced portions with a recess therebetween, said portions engaging said ball valve for moving the same to close off the flow from the inlet port by differential of pressure on opposite sides of the diaphragm, one of said portions moving said ball valve to closed relation with the movement of the diaphragm to a limit position in one direction and the other of said portions moving said ball valve to closed relation with the movement of the diaphragm to a limit position in the opposite direction, and one of said portions freeing said ball valve to gradually move to open relation with the ball valve abutting against said portions.

5. In a fluid shut off valve, a valve body provided with inlet and outlet ports and a flow passage in communication with said ports, a ball valve for closing off the flow of the fluid to the flow passage from the inlet port, said valve body having a cavity and a diaphragm arranged in said cavity subdividing the cavity into oppositely disposed chambers, said valve body having an opening permitting of the flow of outside air to and from one of said chambers and an opening establishing communication between the other chamber and said outlet port, said diaphragm being movable to opposite sides in response to differential of pressure on opposite sides thereof, means connected with said diaphragm and constructed to abut against the periphery of the ball valve at locations disposed respectively on opposite sides of a medial line through said ball valve, and said means abutting the ball valve on one side thereof and moving the same to closed relation with the movement of the diaphragm to one of said positions and said means abutting against the ball valve on the other side thereof and moving the same to closed relation with the movement of said diaphragm to said other position.

6. In a fluid shut off valve, a valve body provided with an inlet and an outlet and a flow passageway in communication with said inlet and outlet, a ball valve for closing off the flow of the fluid from the inlet, reciprocatory means movable in response to variations in pressure thereon and having spaced portions adapted to abut against the periphery of the ball valve at spaced locations respectively, one of the portions of said means abutting against the ball valve and moving the ball valve to closed relation by the movement of said means in response to a drop in pressure on said means and the other portion of said means abutting against the ball valve and moving the same to closed relation with the movement of said means in response to a rise in pressure on said means, and said means being recessed between said spaced portions to permit of the movement of the ball valve to open relation.

7. In a fluid shut off valve, a valve body provided with inlet and outlet ports and a flow passage in communication with said ports, a ball valve for closing off the flow of the fluid to the flow passage from the inlet port, said valve body having a cavity and a diaphragm arranged in said cavity subdividing the cavity into oppositely disposed chambers, said valve body having an opening permitting of the flow of outside air to and from one of said chambers and an opening establishing communication between the other chamber and said outlet port, a lever pivoted to said valve body and having an arm connected with said diaphragm and a free arm provided with spaced portions with a recess therebetween, said portions of the free arm engaging said ball valve for moving the same to close off the flow from the inlet port by differential of pressure on opposite sides of the diaphragm, one of said portions moving said ball valve to closed relation with the movement of the diaphragm to a limit position in one direction and the other of said portions moving said ball valve to closed relation with the movement of the diaphragm to a limit position in the opposite direction, and said recess between said portions permitting of the movement of the ball valve to open relation when the diaphragm is intermediate said positions.

References Cited in the file of this patent

UNITED STATES PATENTS

| | | |
|---|---|---|
| 2,302,284 | Abbot | Nov. 17, 1942 |
| 2,650,059 | Hjulian et al. | Aug. 25, 1953 |
| 2,698,026 | Roberts et al. | Dec. 18, 1954 |